United States Patent
Zhao et al.

(10) Patent No.: US 11,492,006 B2
(45) Date of Patent: Nov. 8, 2022

(54) APPARATUS AND METHODOLOGY OF ROAD CONDITION CLASSIFICATION USING SENSOR DATA

(71) Applicant: GM GLOBAL TECHNOLOGY OPERATIONS LLC, Detroit, MI (US)

(72) Inventors: Qingrong Zhao, Madison Heights, MI (US); Bakhtiar B. Litkouhi, Washington, MI (US); Mohsen Khalili, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 337 days.

(21) Appl. No.: 16/944,911

(22) Filed: Jul. 31, 2020

(65) Prior Publication Data
US 2022/0032946 A1 Feb. 3, 2022

(51) Int. Cl.
| | |
|---|---|
| *B60W 40/06* | (2012.01) |
| *B60W 30/18* | (2012.01) |
| *B60W 60/00* | (2020.01) |
| *B60W 40/105* | (2012.01) |
| *B60R 19/48* | (2006.01) |
| *G06K 9/62* | (2022.01) |
| *G06N 3/08* | (2006.01) |
| *G06V 10/40* | (2022.01) |
| *G06V 20/56* | (2022.01) |

(52) U.S. Cl.
CPC ........... *B60W 60/001* (2020.02); *B60R 19/48* (2013.01); *B60W 30/18* (2013.01); *B60W 40/06* (2013.01); *B60W 40/105* (2013.01); *G06K 9/6267* (2013.01); *G06N 3/08* (2013.01); *G06V 10/40* (2022.01); *G06V 20/56* (2022.01); *B60W 2420/52* (2013.01); *B60W 2552/00* (2020.02); *B60W 2555/20* (2020.02)

(58) Field of Classification Search
CPC .... B60W 60/001; B60W 30/18; B60W 40/06; B60W 40/105; B60W 2552/00; B60W 2555/20; B60W 2420/52; G06V 10/40; G06V 20/56; B60R 19/48; G06K 9/6267; G06N 3/08

See application file for complete search history.

*Primary Examiner* — Mathew Franklin Gordon
(74) *Attorney, Agent, or Firm* — Lorenz & Kopf, LLP

(57) ABSTRACT

Methods and systems are provided for controlling a vehicle action based on a condition of a road on which a vehicle is travelling, including: obtaining first sensor data as to a surface of the road from one or more first sensors onboard the vehicle; obtaining second sensor data from one or more second sensors onboard the vehicle as to a measured parameter pertaining to operation of the vehicle or conditions pertaining thereto; generating a plurality of road surface channel images from the first sensor data, wherein each road surface channel image captures one of a plurality of facets of properties of the first sensor data; classifying, via a processor using a neural network model, the condition of the road on which the vehicle is travelling, based on the measured parameter and the plurality of road surface channel images; and controlling a vehicle action based on the classification of the condition of the road.

20 Claims, 5 Drawing Sheets

APPARATUS AND METHODOLOGY OF ROAD CONDITION CLASSIFICATION USING SENSOR DATA

INTRODUCTION

The technical field generally relates to the field of vehicles and, more specifically, to road condition classification for vehicles using sensor data.

Many vehicles today include sensors for detection of, among other things, road conditions for a road on which the vehicle is travelling. However, in certain embodiments, existing techniques may not always provide optimal classification of road conditions in certain environments.

Accordingly, it is desirable to provide systems and methods for classification of road conditions for a road on which a vehicle is travelling using sensor data. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method for controlling a vehicle action based on a condition of a road on which a vehicle is travelling is provided, the method including: obtaining first sensor data as to a surface of the road from one or more first sensors onboard the vehicle; obtaining second sensor data from one or more second sensors onboard the vehicle as to a measured parameter pertaining to operation of the vehicle or conditions pertaining thereto; generating a plurality of road surface channel images from the first sensor data, wherein each road surface channel image captures one of a plurality of facets of properties of the first sensor data; classifying, via a processor using a neural network model, the condition of the road on which the vehicle is travelling, based on the measured parameter and the plurality of road surface channel images; and controlling a vehicle action based on the classification of the condition of the road.

Also in an exemplary embodiment, the measured parameter comprises a speed of the vehicle.

Also in an exemplary embodiment, the first sensor data is obtained via a plurality of ultra-short range radar (USRR) sensors disposed proximate a front bumper of the vehicle.

Also in an exemplary embodiment, the condition includes a surface condition of a surface of the road, as to whether the surface is wet, dry, or covered with snow.

Also in an exemplary embodiment, the plurality of facets of properties of the first sensor data, as reflected in the surface channel images, include returned energy at an (x,y) position from the first sensors.

Also in an exemplary embodiment, the plurality of facets of properties of the first sensor data, as reflected in the surface channel images, include a Z coordinate at an (x,y) position from the first sensors.

Also in an exemplary embodiment, the plurality of facets of properties of the first sensor data, as reflected in the surface channel images, include a Doppler value at an (x,y) position from the first sensors.

Also in an exemplary embodiment, the plurality of facets of properties of the first sensor data, as reflected in the surface channel images, include a sensor index value at an (x,y) position from the first sensors.

Also in an exemplary embodiment, the plurality of facets of properties of the first sensor data, as reflected in the surface channel images, include each of the following: (i) returned energy at an (x,y) position from the first sensors; (ii) a Z coordinate at the (x,y) position from the first sensors; (iii) a Doppler value at the (x,y) position from the first sensors; and (iv) a sensor index value at the (x,y) position from the first sensors.

Also in an exemplary embodiment, the method further includes: generating, via the processor, a speed image channel based on a categorization of the vehicle speed; and fusing, via the processor, the plurality of road surface channel images with the speed image channel; wherein the step of classifying the condition includes classifying, via the processor using a neural network model, the condition of the road on which the vehicle is travelling, based on the fusing of the plurality of road surface channel images with the speed image channel.

Also in an exemplary embodiment, the method further includes: performing, via the processor, feature extraction from the plurality of road surface channel images; and performing feature level fusion between a categorization of the vehicle speed and the feature extraction form the plurality of road surface channel images; wherein the step of classifying the condition includes classifying, via the processor using a neural network model, the condition of the road on which the vehicle is travelling, based on the feature level fusion between a categorization of the vehicle speed and the feature extraction form the plurality of road surface channel images.

In another exemplary embodiment, a system for controlling a vehicle action based on classifying a condition of a road on which a vehicle is travelling is provided, the system including: one or more first sensors configured to provide first sensor data as to a surface of the road; one or more second sensors configured to provide second sensor data as to a measured parameter pertaining to operation of the vehicle or conditions pertaining thereto; and a processor disposed coupled to the first sensors and the second sensors and configured to: generate a plurality of road surface channel images from the first sensor data, wherein each road surface channel image captures one of a plurality of facets of properties of the first sensor data; classify, using a neural network model, the condition of the road on which the vehicle is travelling, based on the measured parameter and the plurality of road surface channel images; and provide instructions to control a vehicle action based on the condition of the road.

In another exemplary embodiment, a vehicle is provided that includes a body, a drive system, and a control system. The drive system is disposed within the body, and is configured to drive the vehicle. The control system is coupled to the drive system, and includes: one or more first sensors configured to provide first sensor data as to a surface of the road; one or more second sensors configured to provide second sensor data as to a measured parameter pertaining to operation of the vehicle or conditions pertaining thereto; and a processor disposed coupled to the first sensors and the second sensors and configured to: generate a plurality of road surface channel images from the first sensor data, wherein each road surface channel image captures one of a plurality of facets of properties of the first sensor data; classify, using a neural network model, the condition of the road on which the vehicle is travelling, based on the measured parameter and the plurality of road surface channel images; and provide instructions to control a vehicle action based on the condition of the road.

Also in an exemplary embodiment, the vehicle includes a front bumper; and the one or more first sensors include a plurality of ultra-short range radar (USRR) sensors disposed proximate the front bumper of the vehicle.

Also in an exemplary embodiment, the condition includes a surface condition of a surface of the road, as to whether the surface is wet, dry, or covered with snow.

Also in an exemplary embodiment, the condition comprises a material of which a surface of the road is made.

Also in an exemplary embodiment, the plurality of facets of properties of the first sensor data, as reflected in the surface channel images, include returned energy at an (x,y) position from the first sensors.

Also in an exemplary embodiment, the plurality of facets of properties of the first sensor data, as reflected in the surface channel images, include a Doppler value at an (x,y) position from the first sensors.

Also in an exemplary embodiment, the plurality of facets of properties of the first sensor data, as reflected in the surface channel images, include a sensor index value at an (x,y) position from the first sensors.

Also in an exemplary embodiment, wherein the processor is further configured to: generate a speed image channel based on a categorization of the vehicle speed; fuse the plurality of road surface channel images with the speed image channel; and classify, using a neural network model, the condition of the road on which the vehicle is travelling, based on the fusing of the plurality of road surface channel images with the speed image channel.

Also in one exemplary embodiment, the processor is further configured to: perform feature extraction from the plurality of road surface channel images; perform feature level fusion between a categorization of the vehicle speed and the feature extraction form the plurality of road surface channel images; and classify, using a neural network model, the condition of the road on which the vehicle is travelling, based on the feature level fusion between a categorization of the vehicle speed and the feature extraction form the plurality of road surface channel images.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
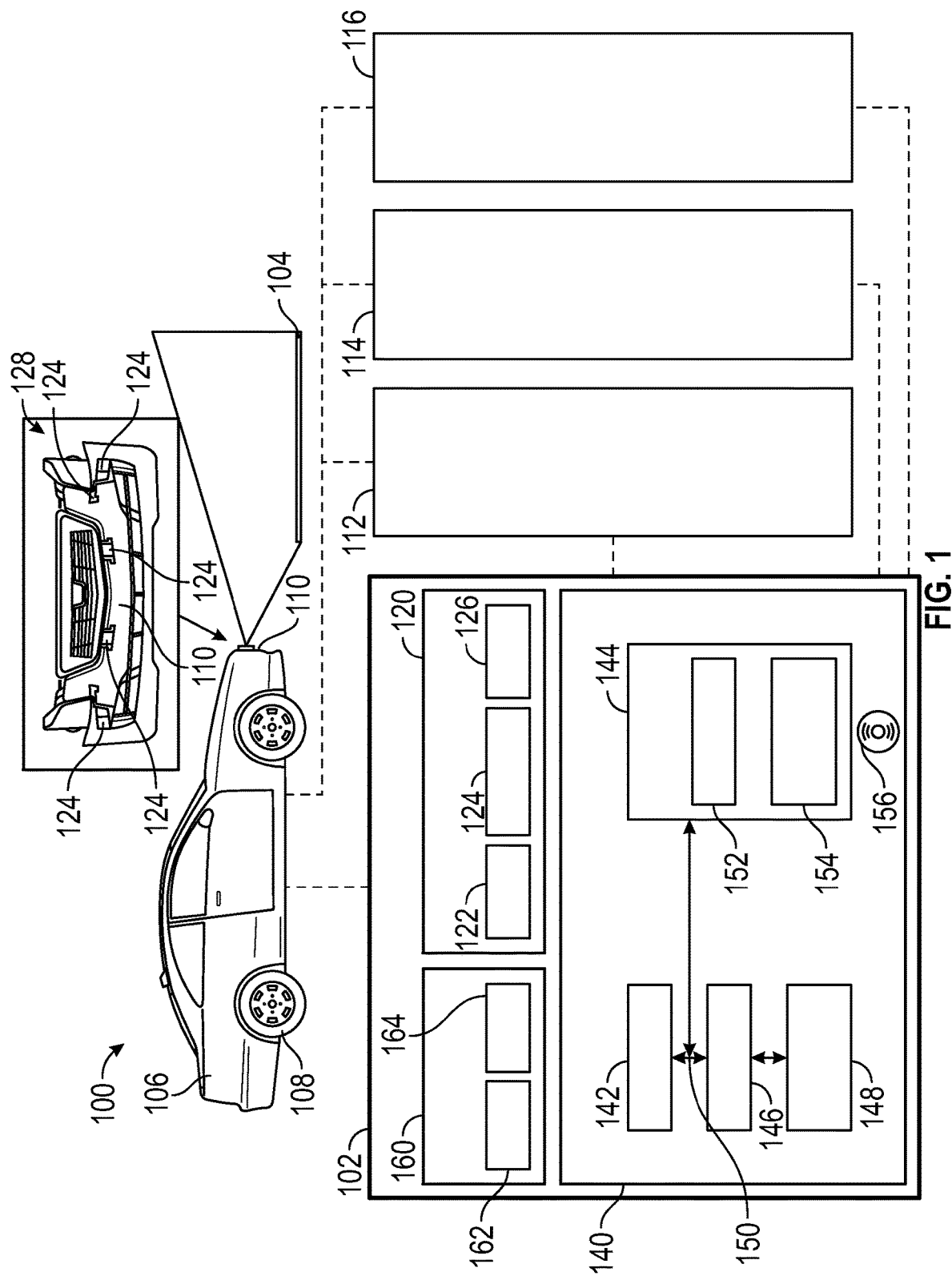
FIG. 1 is a simplified diagram of a vehicle that includes a control system for classifying a road condition of a road on which the vehicle is travelling, in accordance with an exemplary embodiment.

FIG. 1 illustrates a system 100, according to an exemplary embodiment. In various embodiments, and as described below, the system 100 comprises a vehicle 100. However, this may vary in other embodiments. For example, in certain embodiments, the system 100 may comprise any number of other types of mobile and/or non-mobile platforms.

As described in greater detail further below, the vehicle 100 includes a control system 102 for classifying a road condition of a road on which the vehicle 100 is travelling, in accordance with an exemplary embodiment.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise one or more other types of vehicles. In addition, in various embodiments, it will also be appreciated that the vehicle 100 may comprise any number of other types of mobile platforms and/or non-mobile platforms. For example, while a vehicle 100 is depicted in FIG. 1, it will be appreciated that in various other embodiments, the vehicle 100 may instead comprise a traffic control system, a stationary system on a bridge, pole, or other device, and/or any number of different types of non-mobile and/or mobile platforms.

In the depicted embodiment, a body 106 of the vehicle 100 substantially encloses other components of the vehicle 100. Also in the depicted embodiment, the vehicle 100 includes a plurality of wheels 108 and a front bumper 110. Also in the depicted embodiment, the wheels 108 are each disposed near a respective corner of the body 106 to facilitate movement of the vehicle 100. In one embodiment, the vehicle 100 includes four wheels 108, although this may vary in other embodiments (for example for trucks and certain other vehicles). In certain embodiments, the vehicle 100 comprises an autonomous vehicle, such as a semi-autonomous and/or fully autonomous (e.g., self-driving) vehicle 100.

In various embodiments, the vehicle 100 includes a drive system 112 that drives the wheels 108. The drive system 112 preferably comprises a propulsion system. In certain exemplary embodiments, the drive system 112 comprises an internal combustion engine and/or an electric motor/generator. In certain embodiments, the drive system 112 may vary, and/or two or more drive systems 112 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments the vehicle 100 also includes a braking system 114 and a steering system 116, among other vehicle systems. In various embodiments, the braking system 114 and steering system 116 are coupled to and/or part of the drive system 112. As described below, in certain embodiments, the braking system 114 and the steering system 116 include automatic braking and steering functionality, respectively, that utilizes a classification of a road condition of a road on which the vehicle 100 is travelling.

In various embodiments, the braking system 114 provides braking for the vehicle 100, for example when a driver engages a brake pedal of the vehicle 100, and/or as directed by the control system 102 and/or one or more other control systems for the vehicle 100. In various embodiments, the braking system 114 includes an automatic braking component for providing automatic braking for the vehicle 100 when directed to do so by the control system 102, based at least in part on a determined road condition for the road on which the vehicle is travelling. In certain embodiments, such as an autonomous vehicle, braking may be controlled entirely automatically by the vehicle 100 (e.g., via the processor 142 thereof described below).

Also in various embodiments, the steering system 116 provides steering for the vehicle 100, for example when a driver engages a steering wheel of the vehicle 100, and/or as directed by the control system 102 and/or one or more other control systems for the vehicle 100. Also in various embodiments, the steering system 116 includes an automatic steering component for providing automatic steering for the vehicle 100 when directed to do so by the control system 102, based at least in part on a determined road condition for the road on which the vehicle is travelling. In various embodiments, the braking system 114 includes an automatic braking component for providing automatic braking for the vehicle 100 when directed to do so by the control system 102, based at least in part on a determined road condition for the road on which the vehicle is travelling. In certain embodiments, such as an autonomous vehicle, steering may be controlled entirely automatically by the vehicle 100 (e.g., via the processor 142 thereof described below).

As noted above, in various embodiments, the control system 102 provides a classification of a road condition of a road on which the vehicle 100 is travelling, in accordance with an exemplary embodiment. Also in various embodiments, the control system 102 also provides for one or more actions for controlling the vehicle 100, such as providing a notification and/or implementing automatic braking and/or automatic steering based at least in part on the classification of the condition of the road on which the vehicle 100 is travelling. In addition, in various embodiments, the control system 102 provides these functions based on steps of the process 200 of FIG. 2 and/or the alternate process 400 of FIG. 4, as described in greater further below in connection therewith.

As depicted in FIG. 1, in various embodiments, the control system 102 includes a sensor array 120 a controller 140, and a display 160. Each of the sensor 120, controller 140, and display 160 are described in greater detail further below in accordance with an exemplary embodiment.

In various embodiments, the sensor array 120 includes one or more speed sensors 122 and detection sensors 124. In certain embodiments, the sensor array 120 also includes one or more other sensors 126 (for example, one or more other sensors that are utilized, along with vehicle speed and road conditions, in engaging automatic braking, automatic steering, and/or other vehicle functionality).

In various embodiments, the speed sensors 122 measure or determine a speed or velocity of the vehicle 100. For example, in certain embodiments, the speed sensors 122 comprise one or more wheel speed sensors, accelerometers, and/or other sensors for measuring data for determining a speed or velocity of the vehicle 100.

Also in various embodiments, the detection sensors 124 are configured for detecting one or more conditions and/or objects with respect to a road and/or path (collectively referring to herein as a "road") on which the vehicle 100 is travelling. In various embodiments, the detection sensors 124 include a plurality of radar sensors disposed onboard the vehicle 100. In certain embodiments, the detection sensors 124 include a plurality of ultra-short range radar (USRR) sensors disposed on and/or proximate the front bumper 110 of the vehicle 100. However, in various other embodiments, the types of detection sensors 124 may vary, and for example may comprise one or more different types of radar and/or one or more other types of sensors (e.g., which may include sonar, LiDAR, ultrasound, cameras, and/or other types of detection sensors). It will similarly be appreciated that the number and/or placement of the detection sensors 124 may vary in different embodiments.

With continued reference to FIG. 1, a close-up view of a front portion 128 of the vehicle is depicted, in accordance with an exemplary embodiment. As depicted in FIG. 1, four detection sensors 124 (e.g., in one embodiment, four USRR sensors) are disposed along the front portion 128 of the vehicle 100 in proximity to the front bumper 110. However, as noted above, the number, type, and/or placement of the detection sensors 124 may vary in different embodiments. As shown in FIG. 1, in various embodiments, the detection sensors 124 are pointed toward the ground 104, for example representing part of the road on which the vehicle 100 is travelling.

As depicted in FIG. 1, the controller 140 comprises a computer system. In certain embodiments, the controller 140 may also include the sensor array 120 (descried above), the display system 160 (described further below), and/or one or more other vehicle components. In addition, it will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the processes 200, 400 discussed further below in connection with FIGS. 2-5.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash).

In certain examples, the memory 144 is located on and/or co-located on the same computer chip as the processor 142. In the depicted embodiment, the memory 144 stores the above-referenced program 152 along with one or more neural network models 154 (and/or, in certain embodiments, one or more other models, predetermined thresholds, and/or stored values) for classification a condition of the road on which the vehicle 100 is travelling, in accordance with the processes 200, 400 described further below in connection with FIGS. 2-5.

The bus 150 serves to transmit programs, data, status and other information or signals between the various components of the computer system of the controller 140. The interface 146 allows communications to the computer system of the controller 140, for example from a system driver and/or another computer system, and can be implemented using any suitable method and apparatus. In one embodiment, the interface 146 obtains the various data from the sensor array 120, the display system 160, the drive system 112, the braking system 114, the steering system 116, and/or one or more other components and/or systems of the vehicle 100. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the processes 200, 400 discussed further below in connection with FIGS. 2-5. In another exemplary embodiment, the program product may be directly stored in and/or otherwise accessed by the memory 144 and/or one or more other disks 156 and/or other memory devices.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

In various embodiments, the display system 160 of FIG. 1 is coupled to the controller 140, and provides information for a driver and/or other occupants of the vehicle 100 in accordance with instructions provided by the processor 142 of the controller 140. In various embodiments, the display system 160 provides information as to a road condition (such as "dry", "wet", or "snow covered") for a surface of the road on which the vehicle 100 is travelling, and/or one or more other surface conditions for the road (e.g., whether the road surface comprises asphalt, concrete, gravel, dirt, and so on, among other possible surface conditions) based on determinations made by the processor 142.

In the depicted embodiment, the display system 160 includes an audio component 162 and a video component 164. In various embodiments, the audio component 162 provides audio information regarding the road condition (e.g., via one or more vehicle speakers) based on instructions provided by, and determinations made by, the processor 142. Also in certain embodiments, the video component 164 provides audio information regarding the road condition (e.g., via one or more vehicle display screens) based on instructions provided by, and determinations made by, the processor 142. In various other embodiments, the display system 160 may also include one or more other components that provide one or more other different types of notifications to the driver and/or other occupants of the vehicle such as, by way of example, haptic notifications and/or the transmission of notifications to a driver's smart phone and/or other electronic device, among other possible types of notifications.

Figure 2:
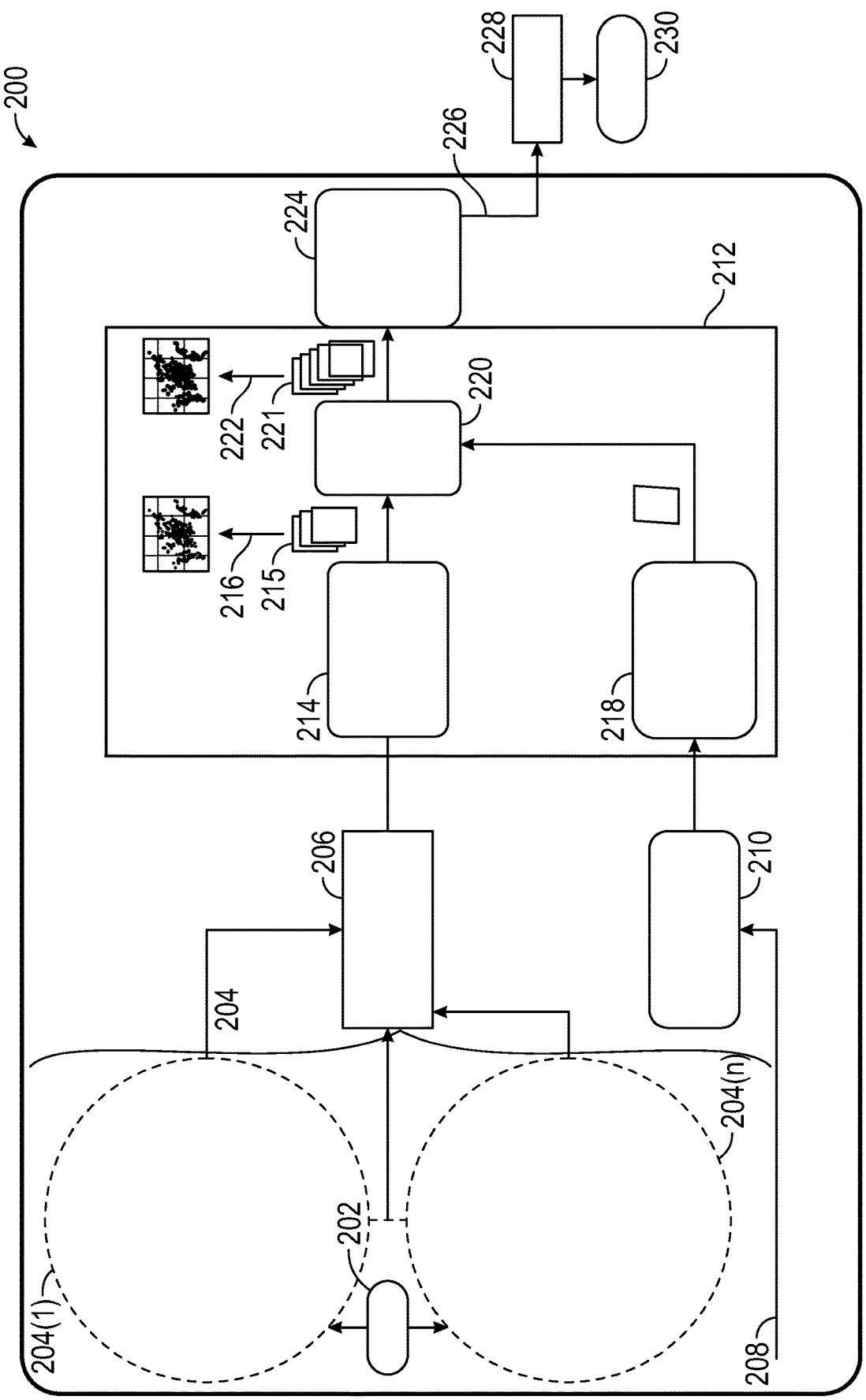
FIG. 2 is a flow diagram of a process for classifying a road condition of a road on which a vehicle is travelling, and that can be implemented in connection with the vehicle of FIG. 1, in accordance with an exemplary embodiment.

FIG. 2 is a flow diagram of a process 200 for classifying a road condition of a road on which a vehicle is travelling, in accordance with an exemplary embodiments. In various embodiments, the process 200 can be implemented in connected with the vehicle 100, including the control system 102 thereof, of FIG. 1.

In various embodiments, the process 200 starts at 202, when the vehicle 100 is in operation. In various embodiments, the process 200 continues throughout the duration of the operation of the vehicle 100.

In various embodiments, road surface data is obtained at 204 from various sensors onboard the vehicle. Specifically, in various embodiments, road surface data is determined form various detection sensors 124 of FIG. 1. In certain embodiments, the road surface data is obtained from ultra-short range radar sensors 124 of FIG. 1 that re disposed proximate the front bumper 110 of FIG. 1. However, in other embodiments, the type, number, and/or placement of the detection sensors 124 utilized in step 204 may vary.

As depicted in FIG. 2, in various embodiments, road surface data is obtained from "n" different detection sensors, as represented in sub-steps 204(1) . . . 204(n) of step 204 of FIG. 2. Also in various embodiments, during each step 204(1) . . . 204(n) of step 204, the various are collected with respect to each detection sensor: (i) returned energy; (ii) (X, Y, Z) coordinate; (iii) sensor index; (iv) Doppler; and (v) cluster index information for each of the detection sensors 124 of FIG. 1.

Also in various embodiments, the road surface data of 204 is concatenated at step 206. In various embodiments, the road surface data of step 204 is obtained by the processor 142 of FIG. 1 from the detection sensors 124 of FIG. 1 and concatenated at step 204 by the processor with respect to the following: (i) returned energy; (ii) (x,y,z) coordinate; (iii) sensor index; (iv) Doppler; and (v) cluster index information. In addition, in various embodiments, the concatenated data is provided as part of a joint data map for novel input data formation as part of block 212 (consisting of steps 214-222), described further below.

In addition, in various embodiments, vehicle speed data is obtained at step 208. In various embodiments, the vehicle speed is measured via one or more speed sensors 122 of FIG. 1, such as one or more vehicle and/or wheel speed sensors of the vehicle 100. In certain other embodiments, the vehicle speed may be calculated by the processor 142 of FIG. 1 via data obtained from one or more speed sensors 122 of FIG. 1, such as one or more wheel speed sensors, accelerometers, and/or other vehicle sensors. In an exemplary embodiment in which USRR sensor data is utilized, such data may be dependent upon vehicle speed, and the process 200 utilizes the vehicle speed for fusion with road surface images for improved detection and classification of road surface conditions (e.g., as discussed below I accordance with an exemplary embodiment). In certain embodiments, one or more other parameters may similarly be utilized, with data collected at step (e.g., including for temperature, humidity, and/or other parameters), that can also be used for similar fusion techniques.

In certain embodiments, the vehicle speed is then categorized at step 210. For example, in certain embodiments, the vehicle speed of step 208 is assigned one of a number of predefined ranges, corresponding to speed categories. For example, in one embodiment, the vehicle speed is assigned a value for a category index "i" as follows: (i) the category index "i" is assigned a value of zero (0) if the vehicle speed is between zero and ten miles per hour (0-10 mph); (ii) the category index "i" is assigned a value of one (1) if the vehicle speed is between ten and twenty miles per hour (10-20 mph); (iii) the category index "i" is assigned a value of two (2) if the vehicle speed is between twenty and thirty miles per hour (20-30 mph); and (iv) the category index "i" is assigned a value of three (3) if the vehicle speed is between thirty and forty miles per hour (30-40 mph); (v) the category index "i" is assigned a value of four (4) if the vehicle speed is between forty and fifty miles per hour (40-50 mph), and so on.

In various embodiments, the categorization of step 210 is performed by the processor 142 of FIG. 1, based on data from the speed sensors 122 of FIG. 1. Also in various embodiments, the categorization of the vehicle speed s provided as part of a joint data map for novel input data formation as part of block 212 (consisting of steps 214-222), also described below.

With reference back to step 206, in various embodiments, the concatenated data of step 206 is provided as part of a joint data map for novel input data formation as part of block 212 of FIG. 2. Specifically, in various embodiments, the concatenated data of step 206 is first utilized in step 214 for multi-channel image formation. In various embodiments, the processor 142 of FIG. 1 utilizes the (i) returned energy; (ii) (x,y,z) coordinated (or "Z coordinate"); (iii) sensor index; (iv) Doppler; and (v) cluster index information from the concatenated data of step 206 to form images among multiple channels for each of the detection sensors 124 of FIG. 1 in depth dimension.

For example, in certain embodiments, during step 214, the processor 142 utilizes a convolutional neural network (CNN) to support an image input with multiple channels in depth dimension, and to enable image based pattern discovery. By way of continued example, in certain embodiments, the processor 142 extracts and formulates relevant sensor data (e.g., from USRR sensors and/or other detection sensors) at each time step into an image with depth, which establishes association and correlation in a deterministic way among different properties of the sensor data clusters in image plan.

Furthermore, in various embodiments, during step 214, each data cluster is associated with each of the following above-described factors; namely: (i) return energy, (ii) Doppler; (iii) (x,y,z) coordinate; and (iv) sensor index. In addition, in certain embodiments, the energy value, energy distribution, Z value, and Doppler value all show different patterns on different road surface conditions. For example, in certain embodiments: (i) most of the energy is reflected away on wet conditions; (ii) returned energy is well spread over snow-covered surface due to subsurface scattering; and (iii) returned energy on dry surface is in between these two extremes. In addition, in certain embodiments, due to the height of snow, the "Z" value can help differentiate snow from other surfaces. Furthermore, also in certain embodiments, Doppler values appear stronger on dry surface than snow, and so on. In addition, in certain embodiments, different patterns may also be utilized for detecting and classifying one or more other surface conditions for the road, such as whether the road surface comprises asphalt, concrete, gravel, dirt, and so on, among other possible surface conditions.

Figure 3:
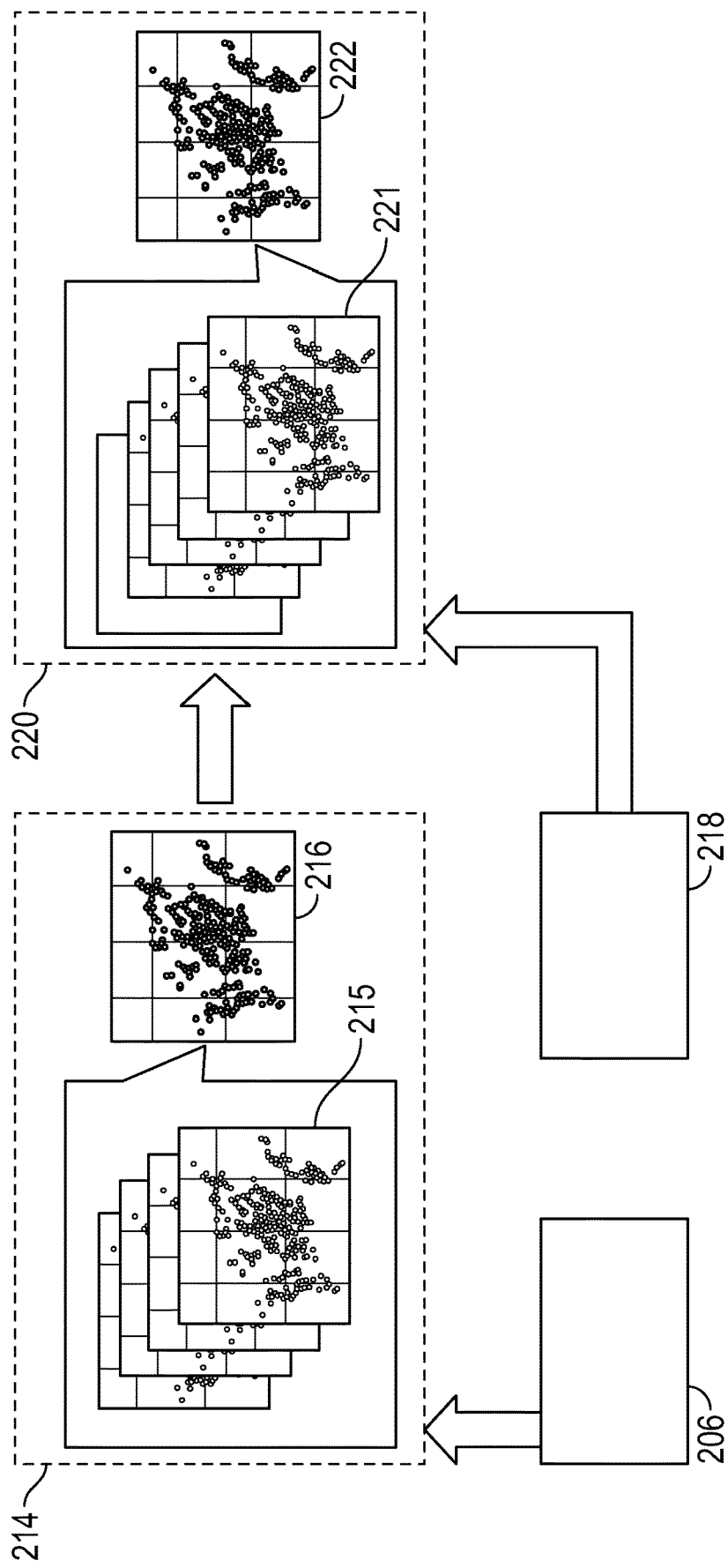
FIG. 3 is a close-up view of exemplary features of the process 200 of FIG. 2, namely: a multi-channel sensor road surface image and image fusion of the road surface image with a vehicle speed image, in accordance with an exemplary embodiment.

In various embodiments, during step 214, sensor image inputs from a variety of channels 215 are utilized to generate resulting image 216. With reference to FIG. 3, the channels 215 and the resulting image 216 are depicted with greater detail, in accordance with an exemplary embodiment. In various embodiments, each of the channels 215 corresponds to a different respective image input factor, including (in an exemplary embodiment): (i) return energy, (ii) Doppler; (iii) (x,y,z) coordinate (or "Z coordinate"); and (iv) sensor index.

Specifically, in various embodiments, each channel image 215 can capture one facet of the properties of the sensor data. For example, in one embodiment: (i) a first channel (also referenced herein as a "red" channel) captures energy associated with each sensor data cluster in its (x,y) position; (ii) a second channel (also referenced herein as a "green" channel) captures Z coordinates associated with each sensor data cluster in its (x,y) position; (iii) a third channel (also referenced herein as a "blue" channel) captures Doppler values associated with each sensor data cluster in its (x,y) position; and (iv) a fourth channel (also referred to herein as a "purple" channel) captures sensor index value associated with each sensor data cluster in its (x,y) position.

In one such exemplary embodiment, return energy values at an (x,y) position, namely, I(x,y) from the first (or red) channel are mapped in accordance with the following equation (Equation 1):

$$P_R(x,y)=f_1(I(x,y)),$$

(in which $P_R(x,y)$ represents the pixel value at the (x,y) position in the red channel), and are then applied to a first (or red) image plane.

In certain embodiments, the channel image formation of step 214 incorporates return energy of the sensor data cluster by using the returned energy values at the (x,y) position, namely, I(x,y) from the first (or red) channel in accordance with the following equation (Equation 2):

$$P_R(x, y) = \begin{cases} \frac{I(x, y)}{I_{max}} & \text{if } (X, Y) \in \text{USRR Data Cluster Points} \\ 0 & \text{Otherwise} \end{cases},$$

in which $I_{max}$ represents the maximal returned energy value from all the different surface conditions.

Also in an exemplary embodiment, Z coordinate values at an (x,y) position, namely, Z(x,y) from the second (or green) channel are mapped in accordance with the following equation (Equation 3):

$$P_G(x,y)=f_2(Z(x,y)),$$

(in which $P_G(x,y)$ represents the pixel value at the (x,y) position in the green channel), and are then applied to a second (or green) image plane.

In certain embodiments, the channel image formation of step 214 incorporates Z values of the sensor data cluster by using the Z values at the (x,y) position, namely, Z(x,y) from the second (or green) channel in accordance with the following equation (Equation 4):

$$P_G(x, y) = \begin{cases} \frac{|Z(x, y)|}{L} * 255 & \text{if } (X, Y) \in \text{USRR Road Data Cluster Points} \\ 0 & \text{Otherwise} \end{cases},$$

in which L is equal to the maximum absolute value of Z.

Also in an exemplary embodiment, Doppler values at an (x,y) position, namely, D(x,y) from the third (or blue) channel are mapped in accordance with the following equation (Equation 5):

$$P_B(x,y)=f_3((x,y)),$$

(in which $P_B(x,y)$ represents the pixel value at the (x,y) position in the blue channel), and are then applied to a third (or blue) image plane.

In certain embodiments, the channel image formation of step 214 incorporates Doppler values of the sensor data cluster by using the Doppler values at the (x,y) position, namely, D(x,y) from the third (or blue) channel in accordance with the following equation (Equation 6):

$$P_B(x, y) = \begin{cases} \frac{|D(x, y)| * 255}{L} & \text{if } (X, Y) \in \text{USRR Data Cluster Points} \\ 0 & \text{Otherwise} \end{cases},$$

in which L is equal to the maximum absolute value of the Doppler value.

Also in an exemplary embodiment, sensor index values at an (x,y) position, namely, $I_d(x,y)$ from the fourth (or purple) channel are mapped in accordance with the following equation (Equation 7):

$$P_P(x,y)=f_4(Id(x,y)),$$

(in which $P_P(x,y)$ represents the pixel value at the (x,y) position in the purple channel), and are then applied to a fourth (or purple) image plane.

In certain embodiments, the channel image formation of step 214 incorporates sensor index values of the sensor data cluster by using the Sensor index values at the (x,y) position, namely, $I_d(x,y)$ from the fourth or purple) channel in accordance with the following equation (Equation 8):

$$P_P(x, y) = \begin{cases} K * I_d & \text{if } (X, Y) \in \text{USRR Data Cluster Points} \\ 0 & \text{Otherwise} \end{cases},$$

in which K is a positive gain with a constraint in accordance with the following equation (Equation 9):

$$K*\max(I_d) \leq 255.$$

With reference back to FIG. 2, in various embodiments, a speed image channel is formed at step 218. In various embodiments, the processor 142 of FIG. 1 generates the speed image channel of step 218 using the vehicle speed categorization of step 210. Specifically, in certain embodiments, the speed image channel image is calculated in accordance with the following equation (Equation 10):

$$P_S(x,y)=K*i,$$

in which $P_S(x,y)$ represents the pixel value at the (x,y) position; "I" represents the vehicle speed category index; and "K" is a positive gain constraint in accordance with the following equation (Equation 11):

$$K*i_{max} \leq 255.$$

With further reference to FIG. 2, the channel images of step 214 and the speed image channel of step 218 are combined together in step 220 for image fusion. In various embodiments, the multi-sensor road surface images of step 214 are stamped with the vehicle speed information (including the vehicle speed categorization of step 210 and/or the speed image channel of step 218) to generate the image fusion in depth dimension. In various embodiments, the image fusion is performed by the processor 242 of FIG. 1. As depicted in FIG. 2, in various embodiments various images 221 are fused together to generate a fused image 222 during step 220.

With reference again to FIG. 3, various channels 221 and the resulting fused image 222 are depicted with greater detail, in accordance with an exemplary embodiment. In various embodiments, each speed image is attached to one or more respective road surface images (e.g., corresponding to images 221) and fused together to generate the depth dimension depicted as fused image 222 in FIG. 3. In various embodiments, this fusion reduces complexity and enhances efficiency and performance for the process 200. In addition, in various embodiments, this fusion also helps to avoid building an unnecessary number of classification models based on different speed ranges. In addition, in various embodiments, the correlations are considered at the earliest stage, to thereby avoid information loss.

As described herein, in various embodiments the fusion is utilized with respect to the channel images of step 214 and the speed image channel of step 218 (which is based on the vehicle speed data collected at step 208), which are combined together in step 220 for image fusion. However, while the fusion herein is descried in connection with vehicle speed, it will appreciated that in certain embodiments, one or more other parameters, such as temperature, humidity, and/or other parameters (e.g., with respect to additional data that may be collected in step 208, described above) may also be utilized for the fusion, instead of or in addition to vehicle speed, with the channel images of step 214.

With reference back to FIG. 2, in various embodiments, the fused image 222 of step 220 is utilized (in various iterations) in connection with a neural network classifier at step 224. In various embodiments, the processor 142 utilizes a convolutional neural network (CNN) model 154 stored in the memory 144 of FIG. 1 in multiple iterations to classify the road surface depicted in images from multiple detection sensors 124 of FIG. 1. In various embodiments, the CNN model utilizes training data in which predicted truth is compared against the ground truth with respect to a condition of the road. Also in various embodiments, the road conditions are "dry", "wet", and "snow" with respect to the road. In certain embodiments, other possible types of road surfaces and/or other conditions may also be utilized. For example, in certain embodiments, the road conditions may also comprise one or more other surface conditions for the road, such as whether the road surface comprises asphalt, concrete, gravel, dirt, and so on, among other possible surface conditions. In addition, in various embodiments, a training dataset is utilized to build a confusion matrix utilizing various values of "ground truth dry", "ground truth wet", and "ground truth snow" in comparison with "values of "predicted dry", "predicted wet", and "predicted snow" values (and/or similar comparisons for other road surface conditions), for training the CNN model.

In various embodiment, the classification of step 224 results in a determined road surface type 226. Specifically, in various embodiments, the determined road surface type 226 comprises a determination as the condition of the road on which the vehicle 100 is travelling as one of the following: "dry", "wet", or "snow" with respect to the ground 104 of FIG. 1 of the road on which the vehicle 100 is being operated. In certain embodiments, determinations may be made with respect to one or more other surface conditions for the road, such as whether the road surface comprises asphalt, concrete, gravel, dirt, and so on, among other possible surface conditions. For example, in certain embodiments, a dry surface may be further categorized as being a dry asphalt road surface, a dry concrete road surface, a dry gravel surface, and/or a dry dirt road surface, and so on. In various embodiments, these determinations are made by the processor 142 of FIG. 1 using the neural network model (e.g., CNN) stored in the memory 144 of FIG. 1.

In addition, in various embodiments, one or more actions are provided at step 228 based on the classification of step 224. In various embodiments, the processor 142 of FIG. 1 provides instructions for one or more vehicle actions based on the classification of the road surface type 226, specifically, as to whether a surface of the road is categorized as "dry", "wet", or "snow"). In certain embodiments, the action may pertain to one or more other surface conditions for the road, such as whether the road surface comprises asphalt, concrete, gravel, dirt, and so on, among other possible surface conditions. In certain embodiments, one or more audio, visual, haptic, electronic message, and/or other notifications are provided by the display system 160 of FIG. 1 for the driver and/or other occupants of the vehicle 100 of FIG. 1 as to the road surface type 226, in accordance with instructions provided by the processor 142.

In addition, in certain embodiments, control of vehicle movement may also be automatically be implemented and/or adjusted based on the road surface type 126, based on instructions provided by the processor 142. For example, in certain embodiments, automatic braking, automatic steering, and/or one or more other vehicle functions may be implemented based at least in part on the road surface type 126 in accordance with instructions provided by the processor 142. By way of continued example, one or more automatic braking thresholds and/or automatic steering thresholds (e.g., pertaining to a distance to object or time to object, and so on) may be adjusted based on the road surface type 126, and so on. In addition, in certain embodiments, one or more other automatic driving actions may also be performed automatically via instructions provided by the processor 142, such as (by way of example) revising a selected route of travel, changing one or more other driving parameters, modes, and/or thresholds (e.g., by automatically adjusting a speed of the vehicle, automatically adjusting a threshold distance for following a lead vehicle and/or one or more actions for controlling movement of the vehicle 100, such as in the case of an autonomous or self-driving vehicle, and so on). In certain embodiments, the process 200 then terminates at 230.

Figure 4:
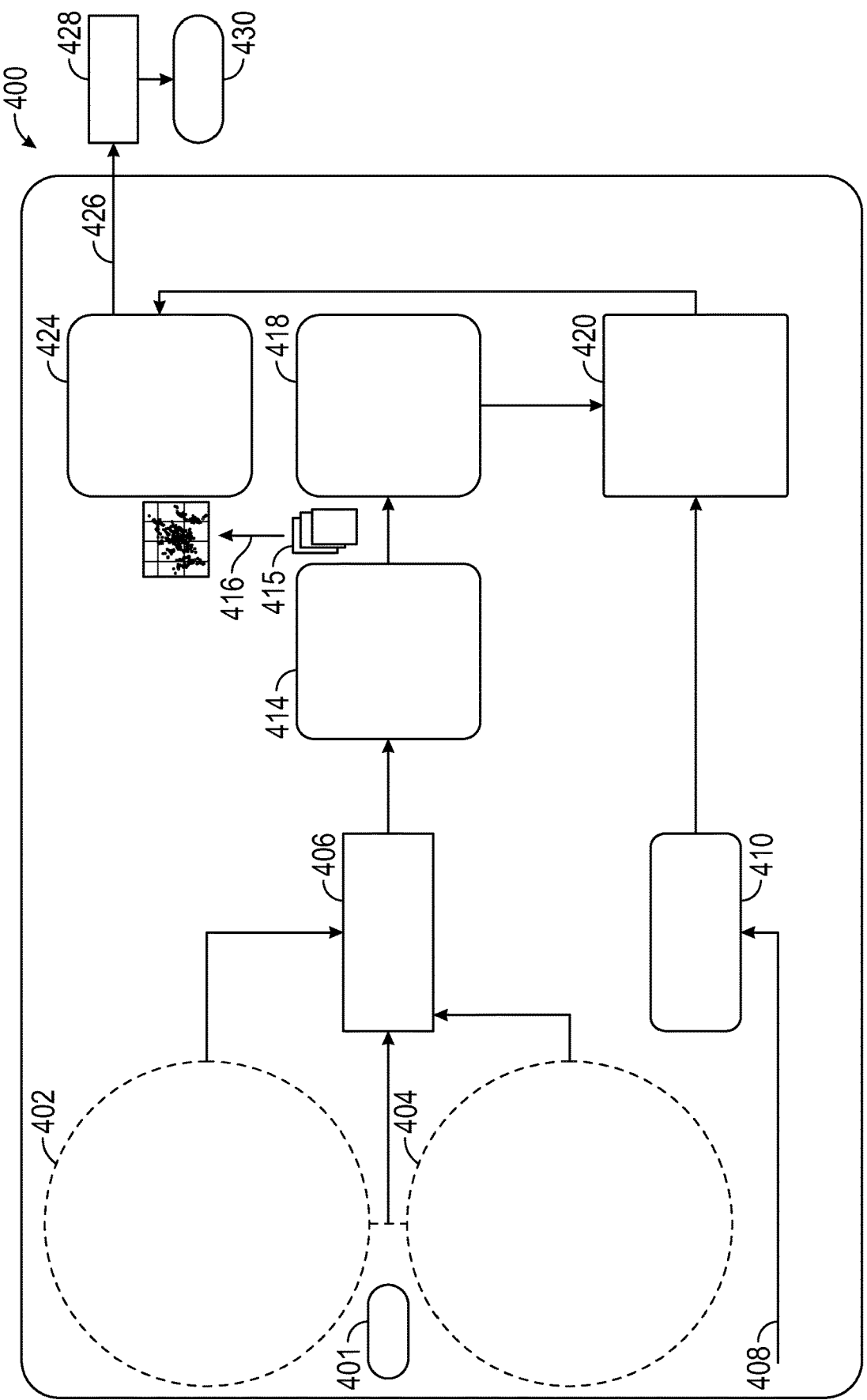
FIG. 4 is a flow diagram of an alternate process for classifying a road condition of a road on which a vehicle is travelling, and that can be implemented in connection with the vehicle of FIG. 1, in accordance with an exemplary embodiment.

FIG. 4 is a flow diagram of an alternate process 400 for classifying a road condition of a road on which a vehicle is travelling, in accordance with an exemplary embodiment. In various embodiment, the alternate process 400 can be implemented in connection with the vehicle 100 and control system 102 of FIG. 1, in accordance with an exemplary embodiment.

In various embodiments, the process 400 starts at 402, when the vehicle 100 is in operation. In various embodiments, the process 400 continues throughout the duration of the operation of the vehicle 100.

In various embodiments, road surface data is obtained at 404 from various sensors onboard the vehicle. Specifically, in various embodiments, road surface data is determined form various detection sensors 124 of FIG. 1, in a manner that is similar to step 204 of the process 200 of FIG. 2, described above.

Also in various embodiments, the road surface data of 404 is concatenated at step 406. In various embodiments, the road surface data of step 404 is obtained by the processor 142 of FIG. 1 from the detection sensors 124 of FIG. 1 and concatenated at step 404 by the processor with respect to the following: (i) returned energy; (ii) (x,y,z) coordinate; (iii) sensor index; (iv) Doppler; and (v) cluster index information, in a manner that is similar to step 206 of the process 200 of FIG. 2, described above.

In addition, in various embodiments, vehicle speed data is obtained at step 408. In various embodiments, the vehicle speed is measured and/or determined from sensor values from one or more speed sensors 122 of FIG. 1, in a manner that is similar to step 208 of the process 200 of FIG. 2, described above. Similar to the discussion above in connection with step 208, in certain embodiments, sensor data may also be obtained with respect to one or more other parameters, such as temperature and/or humidity (by way of example).

In certain embodiments, the vehicle speed is then categorized at step 410. For example, in certain embodiments, the vehicle speed of step 408 is assigned one of a number of predefined ranges, corresponding to speed categories, in a manner that is similar to step 210 of the process 200 of FIG. 2, described above.

With reference back to step 406, in various embodiments, the concatenated data of step 406 is utilized in step 414 for multi-channel image formation. In various embodiments, the processor 142 of FIG. 1 utilizes the (i) returned energy; (ii) (x,y,z) coordinate; (iii) sensor index; (iv) Doppler; and (v) cluster index information from the concatenated data of step 406 to form images among multiple channels for each of the detection sensors 124 of FIG. 1 in depth dimension, in a manner that is similar to step 214 of the process 200 of FIG. 2, described above. For example, in certain embodiments, during step 414, sensor image inputs from a variety of channels 415 are utilized to generate resulting image 416, in a manner that is similar to step 214 of the process 200 of FIG. 2, described above.

In addition, in various embodiments of the alternate process 400 of FIG. 4, features are extracted at step 418. In various embodiments, the features are extracted from the resulting image 416 of step 414, via the processor 142 of FIG. 1 using the neural network model 154 (e.g., a CNN) stored in the memory 144 of FIG. 1.

Also in various embodiments of the alternate process 400 of FIG. 4, feature level fusion is performed at step 420. In various embodiments, the processor 142 of FIG. 1 performs the feature level fusion with respect to the extracted features of step 418 in combination with the vehicle speed categorization of step 410 (and in certain embodiments, with respect to other parameters, such as temperature and/or humidity, similar to the discussion above with respect to step 220 of FIG. 2).

In addition, in various embodiments, a classification is made at step 424. In various embodiments, the processor 124 of FIG. 1 generates a classification at step 424 as to a condition of the road, based on the results of the feature level fusion of step 420, using a convolutional neural network (CNN) model 154 stored in the memory 144 of FIG. 1 in multiple iterations to classify the road surface depicted in images from multiple detection sensors 124 of FIG. 1. In various embodiments, the CNN model utilizes training data in which predicted truth is compared against the ground truth with respect to a condition of the road. Also in various embodiments, the road conditions are "dry", "wet", and "snow" with respect to the road. In certain embodiments, the neural network model may also be used to predict one or more other surface conditions for the road, such as whether the road surface comprises asphalt, concrete, gravel, dirt, and so on, among other possible surface conditions. In various embodiments, the algorithm and techniques disclosed herein detect road conditions (e.g., dry, wet, snow, and in certain embodiments other road surface conditions) with a high degree of accuracy as compared with existing techniques.

In various embodiment, the classification of step 424 results in a determined road surface type 426. Specifically, in various embodiments, the determined road surface type 426 comprises a determination as the condition of the road on which the vehicle 100 is travelling as one of the following: "dry", "wet", or "snow" with respect to the ground 104 of FIG. 1 of the road on which the vehicle 100 is being operated. In certain embodiments, determinations may similarly be made with respect to one or more other surface conditions for the road, such as whether the road surface comprises asphalt, concrete, gravel, dirt, and so on, among other possible surface conditions. For example, in certain embodiments, a dry surface may be further categorized as being a dry asphalt road surface, a dry concrete road surface, a dry gravel surface, and/or a dry dirt road surface, and so on. In various embodiments, these determinations are made by the processor 142 of FIG. 1 using the neural network model (e.g., CNN) stored in the memory 144 of FIG. 1.

In addition, in various embodiments, one or more actions are provided at step 428 based on the classification of step 424. Similar to the discussion above with respect to step 228 of the process 200 of FIG. 2, in various embodiments the processor 142 of FIG. 1 provides instructions for one or more vehicle actions based on the classification of the road surface type 426, specifically, as to whether a surface of the road is categorized as "dry", "wet", or "snow"). In certain embodiments, the actions may also be based on one or more other surface conditions for the road, such as whether the road surface comprises asphalt, concrete, gravel, dirt, and so on, among other possible surface conditions. In certain embodiments, one or more audio, visual, haptic, electronic message, and/or other notifications are provided by the display system 160 of FIG. 1 for the driver and/or other occupants of the vehicle 100 of FIG. 1 as to the road surface type 426, in accordance with instructions provided by the processor 142.

In addition, in certain embodiments, also similar to the discussion above with respect to the process 200 of FIG. 2, control of vehicle movement may also be automatically be implemented and/or adjusted based on the road surface type 426, based on instructions provided by the processor 142. For example, in certain embodiments, automatic braking, automatic steering, and/or one or more other vehicle functions may be implemented based at least in part on the road surface type 426 in accordance with instructions provided by the processor 142. By way of continued example, one or more automatic braking thresholds and/or automatic steering thresholds (e.g., pertaining to a distance to object or time to object, and so on) may be adjusted based on the road surface type 126, and so on. In addition, in certain embodiments, one or more other automatic driving actions may also be performed automatically via instructions provided by the processor 142, such as (by way of example) revising a selected route of travel, changing one or more other driving parameters, modes, and/or thresholds (e.g., by automatically adjusting a speed of the vehicle, automatically adjusting a threshold distance for following a lead vehicle and/or one or more actions for controlling movement of the vehicle 100, such as in the case of an autonomous or self-driving vehicle, and so on). In certain embodiments, the process 400 then terminates at 430.

Figure 5:
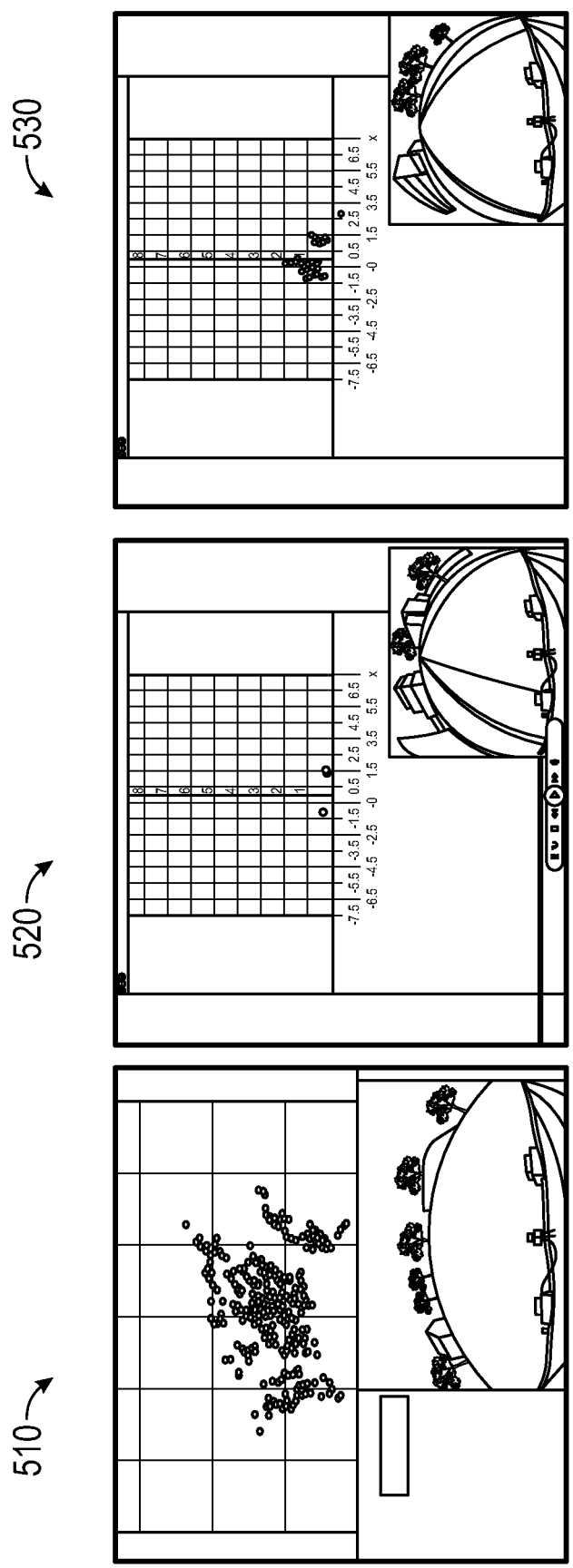
FIG. 5 are depictions of sensor-generated images of different road conditions as determined via the process of FIG. 2 and/or the alternate process of FIG. 4, in accordance with an exemplary embodiment.

FIG. 5 provides depictions of sensor-generated images of different road conditions as determined via the process 200 of FIG. 2 and/or the alternate process 400 of FIG. 4, in accordance with an exemplary embodiment. As depicted in FIG. 5, in an exemplary embodiment, a first exemplary image 510 is provided for a snow-covered road surface, in which substantial subsurface scattering is present, and in which a relatively high number of signals return to the vehicle 100 due to the subsurface scattering. Also as depicted in FIG. 5 in accordance with an exemplary embodiment, a second exemplary image 520 is provided of a wet road surface, in which a majority of the sensor signals are reflected away from the vehicle 100. Finally, also as depicted in FIG. 5 in accordance with an exemplary embodiment, a third exemplary image 530 is provided of a dry road surface.

As depicted in FIG. 5, with the dry road surface, the scattering of the sensor signals is in between the level of scattering present in the snow and wet surface images. Specifically, in certain embodiments, for the dry surface, an intermediate amount of sensor signals are reflected away from the vehicle, at a reflection rate that is between those of the snow-covered and wet surfaces. Accordingly, in certain embodiments: (i) a road with a snow-covered surface reflects sensor signals away from the vehicle 100 at a first rate; (ii) a road with a wet surface reflects sensor signals away from the vehicle 100 at a second rate that is greater than the first rate; and (iii) a road with a dry surface reflects sensor signals away from the vehicle 100 at a third rate that is greater than the first rate of the snow-covered surface and less than the third rate of the wet surface. In addition, as noted above, in certain embodiments, the processes may similarly be implemented in connection with one or more other surface conditions for the road, such as whether the road surface comprises asphalt, concrete, gravel, dirt, and so on, among other possible surface conditions.

Accordingly, systems, methods, and vehicle are provided for classifying a condition of a road on which the vehicle is travelling. In certain embodiments, data from a plurality of detection sensors onboard the vehicle are utilized, along with a convolutional neural network, for classifying the road surface as wet, dry, or snow-covered. Also in various embodiments, the classification of the road surface may be used in implementing one or more vehicle actions, such as one or more driver notifications and/or other vehicle control actions.

It will be appreciated that the systems, vehicles, methods, applications, and implementations may vary from those depicted in the Figures and described herein. For example, in various embodiments, the vehicle 100, the control system 102, and/or various components thereof, and/or other components may differ from those depicted in FIG. 1. It will similarly be appreciated that the steps of the processes 200, 400 may differ, and/or that various steps thereof may be performed simultaneously and/or in a different order, than those depicted in FIGS. 2 and/or 4 and/or described above. It will likewise be appreciated that implementations of FIGS. 3 and 5 may also vary in different embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a vehicle action based on a condition of a road on which a vehicle is travelling, the method comprising:
    obtaining first sensor data as to a surface of the road from one or more first sensors onboard the vehicle;
    obtaining second sensor data from one or more second sensors onboard the vehicle as to a measured parameter pertaining to operation of the vehicle or conditions pertaining thereto;
    generating a plurality of road surface channel images from the first sensor data, wherein each road surface channel image captures one of a plurality of facets of properties of the first sensor data;
    classifying, via a processor using a neural network model, the condition of the road on which the vehicle is travelling, based on the measured parameter and the plurality of road surface channel images; and
    controlling a vehicle action based on the classification of the condition of the road.

2. The method of claim 1, wherein the parameter comprises a speed of the vehicle.

3. The method of claim 1, wherein the plurality of facets of properties of the first sensor data, as reflected in the surface channel images, include returned energy at an (x,y) position from the first sensors.

4. The method of claim 1, wherein the plurality of facets of properties of the first sensor data, as reflected in the surface channel images, include a Z coordinate at an (x,y) position from the first sensors.

5. The method of claim 1, wherein the plurality of facets of properties of the first sensor data, as reflected in the surface channel images, include a Doppler value at an (x,y) position from the first sensors.

6. The method of claim 1, wherein the plurality of facets of properties of the first sensor data, as reflected in the surface channel images, include a sensor index value at an (x,y) position from the first sensors.

7. The method of claim 1, wherein the plurality of facets of properties of the first sensor data, as reflected in the surface channel images, include each of the following: (i) returned energy at an (x,y) position from the first sensors; (ii) a Z coordinate at the (x,y) position from the first sensors; (iii) a Doppler value at the (x,y) position from the first sensors; and (iv) a sensor index value at the (x,y) position from the first sensors.

8. The method of claim 2, further comprising:
    generating, via the processor, a speed image channel based on a categorization of the vehicle speed; and
    fusing, via the processor, the plurality of road surface channel images with the speed image channel;
    wherein the step of classifying the condition comprises classifying, via the processor using a neural network model, the condition of the road on which the vehicle is travelling, based on the fusing of the plurality of road surface channel images with the speed image channel.

9. The method of claim 2, further comprising:
    performing, via the processor, feature extraction from the plurality of road surface channel images; and
    performing feature level fusion between a categorization of the vehicle speed and the feature extraction form the plurality of road surface channel images;
    wherein the step of classifying the condition comprises classifying, via the processor using a neural network model, the condition of the road on which the vehicle is travelling, based on the feature level fusion between a categorization of the vehicle speed and the feature extraction form the plurality of road surface channel images.

10. A system for controlling a vehicle action based on classifying a condition of a road on which a vehicle is travelling, the system comprising:
    one or more first sensors configured to provide first sensor data as to a surface of the road;
    one or more second sensors configured to provide second sensor data as to a measured parameter pertaining to operation of the vehicle or conditions pertaining thereto; and
    a processor disposed coupled to the first sensors and the second sensors and configured to:
        generate a plurality of road surface channel images from the first sensor data, wherein each road surface channel image captures one of a plurality of facets of properties of the first sensor data;
        classify, using a neural network model, the condition of the road on which the vehicle is travelling, based on the measured parameter and the plurality of road surface channel images; and
        provide instructions to control a vehicle action based on the condition of the road.

11. A vehicle comprising:
    a body;
    a drive system disposed within the body and configured to drive the vehicle; and
    a control system coupled to the drive system, the control system comprising:
        one or more first sensors configured to provide first sensor data as to a surface of the road;

one or more second sensors configured to provide second sensor data as to a measured parameter pertaining to operation of the vehicle or conditions pertaining thereto; and a processor disposed coupled to the first sensors and the second sensors and configured to:

generate a plurality of road surface channel images from the first sensor data, wherein each road surface channel image captures one of a plurality of facets of properties of the first sensor data;

classify, using a neural network model, the condition of the road on which the vehicle is travelling, based on the measured parameter and the plurality of road surface channel images; and provide instructions to control a vehicle action based on the condition of the road.

12. The vehicle of claim 11, wherein the parameter comprises a speed of the vehicle.

13. The vehicle of claim 12, wherein:
the vehicle includes a front bumper; and
the one or more first sensors comprise a plurality of ultra-short range radar (USRR) sensors disposed proximate the front bumper of the vehicle.

14. The vehicle of claim 11, wherein the condition comprises a surface condition of a surface of the road, as to whether the surface is wet, dry, or covered with snow.

15. The vehicle of claim 11, wherein the condition comprises a material of which a surface of the road is made.

16. The vehicle of claim 11, wherein the plurality of facets of properties of the first sensor data, as reflected in the surface channel images, include returned energy at an (x,y) position from the first sensors.

17. The vehicle of claim 11, wherein the plurality of facets of properties of the first sensor data, as reflected in the surface channel images, include a Doppler value at an (x,y) position from the first sensors.

18. The vehicle of claim 11, wherein the plurality of facets of properties of the first sensor data, as reflected in the surface channel images, include a sensor index value at an (x,y) position from the first sensors.

19. The vehicle of claim 12, wherein the processor is further configured to:

generate a speed image channel based on a categorization of the vehicle speed;

fuse the plurality of road surface channel images with the speed image channel; and classify, using a neural network model, the condition of the road on which the vehicle is travelling, based on the fusing of the plurality of road surface channel images with the speed image channel.

20. The vehicle of claim 12, wherein the processor is further configured to:

perform feature extraction from the plurality of road surface channel images;

perform feature level fusion between a categorization of the vehicle speed and the feature extraction form the plurality of road surface channel images; and classify, using a neural network model, the condition of the road on which the vehicle is travelling, based on the feature level fusion between a categorization of the vehicle speed and the feature extraction form the plurality of road surface channel images.

* * * * *